United States Patent [19]

Ringwood

[11] Patent Number: 5,288,297
[45] Date of Patent: Feb. 22, 1994

[54] ABRASIVE COMPACT OF CUBIC BORON NITRIDE AND METHOD OF MAKING SAME

[75] Inventor: Alfred E. Ringwood, Redhill, Australia

[73] Assignee: The Australian National University, Acton, Australia

[21] Appl. No.: 978,386

[22] Filed: Nov. 18, 1992

[30] Foreign Application Priority Data

May 25, 1990 [AU] Australia .................. PK 0297
Apr. 17, 1991 [WO] PCT Int'l Appl. .................. PCT/AU91/00144

[51] Int. Cl.$^5$ .............................. B24D 3/00
[52] U.S. Cl. ........................ 51/293; 51/308; 51/309; 501/96; 501/97
[58] Field of Search .............. 51/293, 308, 309; 501/96, 97

[56] References Cited

U.S. PATENT DOCUMENTS

| | | | |
|---|---|---|---|
| 3,743,489 | 7/1973 | Wentorf, Jr. et al. | 51/307 |
| 3,767,371 | 10/1973 | Wentorf, Jr. et al. | 51/309 |
| 4,224,380 | 9/1980 | Bovenkerk et al. | 51/309 |
| 4,776,862 | 10/1988 | Wiand | 51/293 |
| 4,899,922 | 2/1990 | Stutz et al. | 51/293 |
| 4,968,326 | 11/1990 | Wiand | 51/293 |
| 5,000,760 | 3/1991 | Ohtsubo et al. | 51/293 |
| 5,106,392 | 4/1992 | Stutz et al. | 51/293 |

FOREIGN PATENT DOCUMENTS 55-062861  5/1980  Japan .

*Primary Examiner*—Mark L. Bell
*Assistant Examiner*—Willie J. Thompson
*Attorney, Agent, or Firm*—Nixon & Vanderhye

[57] ABSTRACT

An abrasive compact comprising 40 to 90 volume percent of cubic boron nitride (CBN) crystals bonded by 60 to 10 volume percent of a bonding matrix comprised mainly of an intimate mixture of silicon nitride and metallic diboride $MB_2$ where M represents metal atoms chosen from the group of titanium, zirconium and hafnium atoms. The compact may be produced by a method which comprises intimately mixing particulate CBN crystals with a bonding agent in the proportion 95 to 60 volume percent of CBN and 5 to 40 volume percent of bonding agent, the bonding agent containing the metal atoms in the atomic proportions $Si_{30}M_{70}$ to $Si_{85}M_{15}$, subjecting the mixture of CBN crystals and bonding agent to temperatures in the range 900° to 1800° C. and pressures in the range 5 to 70 Kilobars, and maintaining the temperature and pressure conditions for a period of at least about 30 seconds, sufficient to cause most of bonding agent to form the bonding matrix.

22 Claims, No Drawings

ABRASIVE COMPACT OF CUBIC BORON NITRIDE AND METHOD OF MAKING SAME

TECHNICAL FIELD

This invention relates to an improved abrasive compact composed mainly of cubic boron nitride (CBN) and to a process for producing this compact.

Many different kinds of CBN compacts have been described in the literature and their properties vary widely. Generally speaking, a CBN compact is understood to mean a polycrystalline body possessing substantial abrasiveness and low or negligible porosity, comprised of more than about 50 percent by volume of CBN crystals in which a large proportion of contacts occur between individual CBN crystals.

In one class of CBN compacts, which usually contains more than about 80 percent by volume of CBN crystals, the CBN crystals are believed to be joined at their contacts by direct chemical bonds between boron and nitrogen. This means that the CBN crystalline structure is essentially continuous between adjacent CBN crystals. Representative U.S. patents describing this class of compacts are No. 3,743,489 (Wentorf et al.; and No. 4,666,466 (Wilson).

U.S. Pat. No. 3,743,489 describes a cubic boron nitride compact comprising a thin layer of CBN bonded to a cemented carbide support. The compact comprises an intergrowth of CBN crystals and a minor amount of one or more metallic phases containing aluminum and at least one element selected from the group consisting of nickel, cobalt, manganese, iron, vanadium and chromium. The compact is produced within the thermodynamic stability field of CBN, preferably at about 55 kilobars and 1300°–1600° C. U.S. Pat. No. 4,666,466 describes a monolithic cubic boron nitride compact comprised of at least 80 percent by weight of CBN crystals which are directly bonded to each other and intergrown with a minor amount of bonding matrix comprised of aluminum nitride and/or aluminum diboride. This compact is also produced in the thermodynamic stability field of CBN, preferably at 50–65 kilobars and 1400°–1600° C. U.S. Pat. No. 3,944,398 (Bell) described a CBN compact in which CBN particles are bonded by an intergrowth formed by the reaction of intermixed silicon nitride particles and aluminum or an aluminum alloy. This compact is also produced in the CBN thermodynamic stability field, preferably at about 55 kilobars and 1300° C. U.S. Pat. No. 3,852,078 (Wakatsuki et al.) describes a CBN compact formed by mixing hexagonal boron nitride powder with a wide range of refractory materials, including titanium diboride, and subjecting the mixture to pressures and temperatures in the CBN thermodynamic stability field, preferably at about 75 kilobars and 1700° C.

A second class of CBN compacts exists which are composed of more than 50 percent by volume of CBN and less than 50 percent bonding materials, wherein the CBN crystals are not strongly bonded at their mutual contacts and the cohesion of the compact is provided mainly by bonding between the CBN crystals and the bonding agents. This class of compact has been made both at low pressures, inside the thermodynamic stability field of hexagonal boron nitride, and at high pressures, in the thermodynamic stability field of CBN.

U.S. Pat. No. 4,353,714 (Lee et al.: describes a compact in this latter class comprising 65–85 volume percent of CBN bonded mainly by elemental silicon which was infiltrated into a mass of metal-coated CBN crystals at a temperature of about 1500° C. and a pressure of about 1 kilobar. Compacts produced by this method are much weaker and less abrasive than those produced according to the first class, but can be produced in larger individual sizes. U.S. Pat. No. 4,220,455 (St. Pierre et al.; describes a compact comprised mainly of CBN crystals mixed with elemental carbon which is infiltrated by molten silicon in a vacuum at a temperature above 1400° C. The silicon partially reacts with the carbon to produce silicon carbide, which becomes firmly bonded to CBN crystals. The compact thus comprises a mass of CBN crystals bonded by a mixture of silicon carbide and silicon. This compact is not nearly as strong and abrasive as those of the first class, but can also be produced in larger individual sizes.

U.S. Pat. No. 4,334,928 (Hara and Yazu) describes a compact comprising 80 to 10 volume percent of CBN bonded mainly by a carbide, nitride, or carbonitride of Ti, Zr, Hf, V, Nb or Ta. In one embodiment of this invention, a small proportion of $TiB_2$ is produced by partial reaction of TiN with CBN. In another embodiment, silicon is added in minor amounts to the above-named principal bonding agents in order to catalyse the transformation of hexagonal BN to CBN. The silicon is present in the resultant composite as $TiSi_2$. This invention is performed at relatively high pressures within the thermodynamic stability field of CBN.

It will be appreciated by those skilled in the art that the qualities displayed by CBN compacts proposed in the literature vary over an extremely broad range, according to their compositions, structures, nature of their bonds and their pressures, temperatures and times of fabrication. Many compacts, particularly those produced in the thermodynamic stability field of hexagonal boron nitride at pressures generally below 40 kilobars, may display substantial abrasiveness, but are relatively deficient in toughness and compressive strength. These may be useful for some abrasive purposes, but cannot be practically utilized in applications where a combination of high hardness with high toughness is required, for example, in turning, drilling and grinding hard metallic alloys. CBN compacts used for these purposes should possess high compressive strengths of at least 10 kilobars combined with high fracture toughness and should be substantially superior to cemented tungsten carbide in turning hard metallic alloys. This invention relates to a compact in this latter category.

An objective of a preferred embodiment of the present invention is to produce a CBN compact at relatively low pressures, preferably between 10–40 kilobars, said compact possessing properties at least as advantageous as produced according to U.S. Pat. No. 3,743,489 and No. 4,666,466 under pressures preferably in the range 50–60 kilobars. A further objective of a preferred embodiment of the present invention is to conveniently produce CBN compacts which are larger than those that can be readily produced according to the above U.S. patents. The larger size permits said compacts to be effectively employed in essentially new and industrially important applications such as grinding wheels. Yet another objective of the present invention is to produce CBN compacts which possess electrical conductivities high enough to permit them to be shaped and fabricated readily by electrical discharge machining (EDM) methods. This technique is not readily applicable to the monolithic CBN product "Amborite", manufactured by the De Beers Company, which possesses a relatively low electrical conductivity.

DISCLOSURE OF THE INVENTION

According to the invention there is provided a method for producing a CBN compact which comprises:

intimately mixing a mass of particulate CBN crystals with a bonding agent in the proportions 95 to 60 volume percent of CBN and 5 to 40 volume percent of bonding agent, said bonding agent containing silicon and metal atoms chosen from the group of titanium, zirconium and hafnium atoms in the atomic proportions $Si_{30}M_{70}$ to $Si_{85}M_{15}$, where M represents said metal atoms;

subjecting the mixture of CBN crystals and bonding agent to temperatures in the range 900° to 1800° C. and pressures in the range 5 to 70 kilobars; and maintaining the temperature and pressure conditions on the mixture for a period of at least about 30 seconds, sufficient to cause most of the bonding agent to form a bonding matrix composed of an intimate mixture of silicon nitride ($Si_3N_4$) and metallic diboride ($MB_2$) each comprising at least 25 volume percent of the bonding matrix.

Preferably, the bonding agent contains said silicon and metal atoms in the atomic proportions $Si_{40}M_{60}$ to $Si_{70}M_{30}$. More specifically, a preferred bonding agent contains said silicon and metal atoms in the atomic proportions $Si_{60}M_{40}$ Said bonding agent may comprise:

(a) a mixture of elemental silicon and metal powder (b) an alloy or intermetallic compound between silicon and said metal atoms (c) a mixture of alloys or intermetallic compounds of silicon and said metal atoms (d) a mixture of silicon nitride and metallic diboride $MB_2$, where M represents said metal atoms chosen from the group titanium, zirconium and hafnium atoms.

Preferably, said temperatures and pressures are applied in a sequence and over a sufficient time which causes substantial plastic deformation of the CBN crystals.

A preferred bonding agent is an alloy of or a mixture of intermetallic compounds of silicon and titanium in the overall atomic proportions $Si_{70}Ti_{30}$ to $Si_{40}Ti_{60}$ and preferably in the atomic proportion $Si_{60}Ti_{40}$.

The invention also provides a CBN compact comprising 40 to 90 volume percent of CBN crystals bonded by 60 to 10 volume percent of a bonding matrix comprised mainly of an intimate mixture of silicon nitride and metallic diboride $MB_2$, where M represents metal atoms chosen from the group of titanium, zirconium and hafnium atoms, said silicon nitride and metallic diboride each comprising at least 25 volume percent of the bonding matrix, said bonding matrix producing a strong and coherent bond between CBN crystals. Preferably, said compact possesses a compressive strength of at least 10 kilobars, and contains an electrically conductive diboride phase whereby the compact possesses an electrical conductivity high enough to permit it to be shaped by electrical discharge machining.

Preferably, the CBN crystals display substantial plastic deformation at the boundaries between adjacent crystals and the bonding matrix penetrates between adjacent crystals along said boundaries to produce an interconnected, electrically conductive network.

BEST MODES OF CARRYING OUT THE INVENTION

In the ensuing description of this invention, the production of CBN compacts employing titanium, titanium silicide or titanium diboride as a component of the bonding agent and/or bonding matrix will be assumed. It is to be understood, however, that the aforesaid titanium component can be replaced by zirconium, zirconium silicide or zirconium diboride, or alternatively, by hafnium, hafnium silicide or hafnium diboride or by mixtures, alloys and/or solid solutions of these three elements and their compounds. Examples 10 and 11 illustrate the use of hafnium and zirconium silicides in producing CBN compacts according to the practice of this invention, whilst Example 12 illustrates the combined use of hafnium and titanium silicides.

Pressures in the range 10-40 kilobars are employed in producing compacts according to a preferred embodiment of the present invention. The mechanical strength of the compacts falls significantly as the pressure is reduced below 10 kilobars, although compacts possessing useful properties can be produced at 5 kilobars. CBN compacts according to the present invention can also be produced at pressures as high as 70 kilobars. However, in most cases, the quality of compacts so produced is not substantially superior to those produced at 40 kilobars. An important advantage of performing the invention at pressures below 40 kilobars is that it permits the use of relatively simple apparatus possessing much larger working volumes than the apparatus which is necessary if much higher pressures above 50 kilobars are to be attained, as in U.S. Pat. Nos. 3,743,489 and 4,666,466. In the latter case, it is necessary to use apparatus such as that described in U.S. Pat. No. 2,941,248 (Hall) in which the pressure vessel and pistons are constructed of tungsten carbide and possess a complex geometry which severely restricts the size of the working volume in which the compact is fabricated. On the other hand, if the pressures necessary to produce good quality compacts are less than 40 kilobars, the apparatus used can possess a very simple geometry such as a straight piston which compresses the pressure medium axially within a straight cylinder. This kind of apparatus can readily be scaled up to yield a large working volume and thus can be used to fabricate correspondingly larger compacts. Moreover, the pressure vessel can be constructed mainly of steel, which is much cheaper than tungsten carbide. Because of these factors, CBN compacts can be produced below 40 kilobars at much lower costs than in the more complex apparatus necessary for fabrication at higher pressures.

In a second embodiment of this invention, high pressures in the range 40-70 kilobars, in the thermodynamic stability field of CBN, can be employed. These higher pressures are found to be advantageous in the particular cases where the mean particle size of the CBN employed is smaller than 5 microns.

A wide range of temperatures can be employed in the practice of this invention. The temperature should be high enough to permit the reaction of the metallic bonding agent with CBN to produce a bonding matrix consisting of an intergrowth of titanium diboride and silicon nitride. Preferably this reaction should approach completion. The preferred temperature interval for achieving this objective lies between 1200° and 1600° C. and still more preferably between 1300° and 1500° C. Strong compacts have been made at 1000° C. but their strengths were significantly below those made at 1450° C. The strength of the compact also appears to decrease as temperature exceeds 1600° C. although compacts possessing useful strengths can be prepared at higher temperatures. The practical range of temperatures for the performance of this invention is 900°–1800° C.

In producing CBN compacts according to a preferred embodiment of the invention, it is advantageous to apply pressure and temperature in a sequence which leads to maximum plastic deformation of CBN crystals. This causes the formation of contacts between adjacent grains of CBN in two dimensions, along faces, rather than at points and edges. Thin films of bonding matrix may form between such closely adjacent crystals. This structure provides greater compressive strength and rigidity in the resulting compact. A further advantage is that plastically deformed CBN crystals are harder than undeformed CBN crystals. In order to maximize plastic deformation of CBN crystals, a relatively low pressure, e.g. 2–10 kilobars is first applied to stabilize the pressure cell. Temperature is then increased to 1000°–1200° C., after which pressure is slowly raised to its preferred level (e.g. 25 kilobars) over a period of 2–15 minutes. The gradual application of pressure whilst the CBN crystals are hot leads to extensive plastic deformation with the advantageous results noted above.

In the practice of this invention, the bonding agent is premixed with CBN crystals, rather than infiltrated from the outside as in U.S. Pat. No. 3,743,489. Premixing provides support for the hard CBN particles during application of pressure and thereby minimizes the extensive fracturing of CBN crystals which is characteristic of infiltration processes. This procedure also enhances the degree of plastic deformation of CBN crystals during pressurization.

The silicon-titanium alloy which provides a preferred bonding agent in the present invention may be produced by pre-reacting a mixture of elemental silicon and titanium to form one or more intermetallic compounds such as $Si_2Ti$, $SiTi$ and $Si_3Ti_5$ or a mixture thereof. This bonding agent may be prepared by intimately mixing Si and Ti powders, sealing them in an evacuated silica tube, and then heating the tube at 1000°–1200° C. for 15–30 minutes. The product, an alloy typically comprised mainly of $Si_2Ti$ and $SiTi$ phases with a bulk composition preferably equivalent to $Si_3Ti_2$, is then finely ground until it is mostly finer than 5 microns.

In the practice of the present invention, the finely ground bonding agent is intimately mixed with the mass of CBN crystals prior to being placed in the high pressure-high temperature apparatus. Intimate mixing of bonding agent and CBN particles can be conveniently performed in a commercially available vibratory ball mill. In order to ensure good mixing, the particle size of the bonding agent is preferably smaller than 20 microns and still more preferably smaller than 5 microns. However, the particle size of the bonding agent should preferably be not much smaller than 0.1 microns. Powders finer than this are covered by proportionally large oxide films or absorbed gases which may be deleterious to the quality of the compacts. The particle size of the CBN powders is preferably in the range 1–1000 microns and more preferably in the range 2–200 microns. Still more preferably, the CBN particles are in a range of sizes from 3 to 100 microns with the size distribution chosen so as to maximize the efficiency of packing.

In one embodiment of this invention, the mean particle size of CBN crystals may be smaller than 5 microns. However, when such small particles are used, it is desirable to employ higher pressures, extending to within the thermodynamic stability field of CBN (e.g. 55 kilobars at 1350° C.), in order to produce compacts possessing the optimum combination of abrasive properties. Because of their small particle-sizes, compacts prepared according to this embodiment of the invention produce very smooth surface finishes when used in machining operations.

The time over which maximum pressure and temperature are applied to the charge (defined henceforth as run time) is governed by the objective that an adequate degree of reaction occurs between the bonding agent and CBN particles to produce the desired bonding matrix of silicon nitride plus titanium diboride. At temperatures around 1400° C. and 25 kb, where the bonding agent consists of $Si_xTi_y$ alloy, run times between 3 and 30 minutes lead to extensive degrees of reaction and equilibration, accompanied by the production of mechanically strong and abrasive compacts. A run time of 1 minute also produced a compact which, whilst it was of adequate quality, was nevertheless significantly inferior in mechanical properties to specimens produced with run-times of 5 minutes. The minimum practical run time for application of maximum pressure and temperature is taken as 30 seconds. There does not seem to be much practical advantage in carrying out runs for longer than 60 minutes under the preferred the pressure-temperature conditions.

In a preferred embodiment of the invention, the bonding agent comprises a mixture of intermetallic compounds between titanium and silicon. In the course of reaction at the desired pressure and temperature conditions, the bonding agent reacts with CBN according to the following equation:

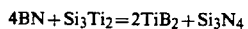

$$4BN + Si_3Ti_2 = 2TiB_2 + Si_3N_4$$

This equation defines the preferred composition of the bonding agent to be in the proportion 3 atomic parts silicon to two atomic parts of titanium. Compacts possessing optimum properties can be produced when this ratio of bonding agents is employed. If the composition of the bonding agent contains a higher proportion of silicon than this, unreacted silicon or silicides (e.g. $Si_2Ti$), may be present in the final product. Where the composition of the bonding agent is richer in titanium, additional TiSi compounds and/or titanium nitride may be present.

Although the $Si_3Ti_2$ atomic ratio is preferred, the composition of the bonding agent can nevertheless be varied substantially and still produce good samples. Preferably, the composition (in atomic percent) of the bonding agent ranges from $Si_{30}Ti_{70}$ to $Si_{85}Ti_{15}$ and still more preferably $Si_{40}Ti_{60}$ to $Si_{70}Ti_{30}$.

In the preferred practice of the invention, the silicon nitride phase present in the bonding matrix comprises essentially pure $Si_3N_4$. However, it is well known that it is possible to substitute oxygen atoms in place of some of the nitrogen atoms, and aluminum atoms in place of silicon, thereby producing a range of solid solutions and compounds possessing crystal structures closely related to beta-silicon nitride. These include the sialons ($Si_{8-x}Al_xN_{8-x}O_x$) and silicon oxynitride, $Si_2N_2O$. If some oxygen is present in the bonding agent of the present invention, introduced, for example, by admixture of some $B_2O_3$ or $TiO_2$, the oxygen may enter the structure of the silicon nitride, either alone, or accompanied by boron, thereby yielding $Si_{8-x}B_xN_{8-x}O_x$ solid solutions or silicon oxynitride. Thus, in the present invention, it is to be understood that the silicon nitride phase may consist of essentially pure $\delta\text{-}Si_3N_4$ or alternatively, it may consist of a phase containing at least 50 wt percent of silicon nitride with a crystal structure closely related to that of $\delta\text{-}Si_3N_4$, but also containing lesser amounts of other elements, including oxygen and/or boron and/or aluminum in solid solution. Example 14 describes a compact containing a bonding agent of this type. The ability of the silicon nitride phase to provide a "sink" for oxygen is useful in removing and fixing the small amount of oxygen which is often present on the surfaces of CBN, possibly as films of $B_2O_3$. The present invention also applies to a compact containing $\alpha\text{-}Si_3N_4$ as a bonding agent although this polymorph of silicon nitride is usually present only in minor proportions.

The proportions of bonding agent which are mixed with CBN particles according to the present invention can also be varied over a substantial range according to the properties desired in the compact. Preferably, the proportion of $Si_xTi_y$ bonding agent which is mixed with CBN particles varies from 5 to 40 volume percent. More preferably the proportion of bonding agent varies from 10 to 25 volume percent. Compositions with lower proportions of bonding matrix yield compacts which tend to be harder, but less tough, than compacts produced from compositions with higher proportions of bonding matrix.

It is possible to utilize other bonding agents possessing compositions containing a ratio of 3 atoms of silicon to 2 atoms of titanium. For example, a bonding agent can be prepared by intimately mixing elemental silicon and titanium powders in the 3/2 atomic ratio and further mixing this bonding agent with CBN particles. However, application of this procedure did not produce compacts possessing a high degree of strength and abrasiveness. An alternative procedure was tested in which the bonding agent was introduced as a mixture of finely particulate (minus 5 micron) silicon nitride plus titanium diboride in proportions such that the bulk composition possessed the $Si_3Ti_2$ atomic composition. Although the compact produced in these experiments was superior to that produced by using elemental silicon and titanium as bonding agents, the resultant compacts did not display such advantageous mechanical properties as the best compacts produced using the preferred silicon-titanium alloy as a bonding agent.

The considerable difference in results obtained by mixing CBN with pre-prepared silicon-titanium alloys, as compared to mixing CBN with the equivalent amount of pure silicon and titanium powders, or with equivalent amounts of $TiB_2$ and $Si_3N_4$ powders, was quite unexpected and is believed to be caused by the following factors:

(1) The pure titanium powder is highly chemically reactive. During heating in the pressure cell, it may become poisoned by reacting with gaseous and other components containing oxygen, carbon, nitrogen and hydrogen, which are often present. This in turn may inhibit its subsequent reactivity. On the other hand, the preferred $Si_xTi_y$ compounds present in the bonding agent are much less reactive chemically with these components and can be heated to above 1400° C. in the pressure cell without losing or reducing their ability to react with CBN to form the bonding matrix;

(2) Si and Ti atoms are intimately mixed in the silicide phases at the atomic level. Moreover, the silicides are very brittle and can be readily ground to particle sizes smaller than 5 microns. These factors enhance the homogeneity of mixing between CBN and bonding agent. On the other hand, titanium metal powder cannot be mixed with silicon with a comparable degree of homogeneity. Moreover, it is difficult to handle titanium powder in particle sizes below 20 microns because of its pyrophoric nature.

(3) The density of $Si_xTi_y$ alloys (compounds) is higher than that of a compositionally equivalent mixture of separate Ti and Si powders. During reaction of $Si_xTi_y$ alloys with CBN, there is a slight expansion of volume whilst the sample is under high pressure, which tends to consolidate the bonding at grain boundaries. On the other hand, where a physical mixture of elemental Si and Ti powders are employed, the reaction with CBN is accompanied by contraction in volume, which can cause the development of internal microcracks in the compact.

It is possible that the problem discussed in (1) above would be solved by very careful preparation of mixtures of Si and Ti powders with CBN particles under clean conditions and under vacuum, and that the charge could be sealed under vacuum into a metallic container prior to being subjected to high pressure and temperature. This would be inconvenient, however, and would not provide the homogeneity of mixing and expansive volume changes which are obtained by the use of $Si_xTi_y$ alloys.

The difference in mechanical properties between compacts produced using $Si_xTi_y$ alloys as bonding agents and those which use equivalent amounts of mixed $Si_3N_4$ and $TiB_2$ powders is also unexpected. It is believed that this difference arises from the fact that in one case, the $Si_xTi_y$ alloy chemically reacts with CBN to produce the desired $Si_3N_4 + TiB_2$ bonding matrix in situ, and that this reaction produces strong chemical bonding between the bonding matrix and the CBN crystals. Moreover, as described below, the bonding matrix possesses a unique microstructure. On the other hand, when pre-prepared $Si_3N_4$ and $TiB_2$ powders are mechanically mixed with CBN particles and then hot pressed, the strength of the bonds between the bonding matrix and CBN particles seems to be weaker and a different microstructure is produced.

The beneficial results obtained from the use of $Si_xTi_y$ alloys as bonding agents, rather than Si and Ti powders, or $Si_3N_4$ and $TiB_2$ powders are not obvious, and could not have been predicted. Corresponding $Si_xHf_y$ and $Si_xZr_y$ alloys likewise demonstrate superior performance as bonding agents as compared to isochemical mixtures of Si and Hf and/or Si and Zr powders. This discovery is an important aspect of the present invention.

The reaction of $Si_xTi_y$ (preferably $Si_3Ti_2$) alloys with CBN according to the process of the present invention produces a bonding matrix composed mainly of $Si_3N_4$ and $TiB_2$ together with a small amount of unreacted $Si_xTi_y$ alloys, principally $Si_2Ti$. The bonding matrix has been finely injected along CBN grain boundaries, producing a unique microstructure in which $TiB_2$ (possessing high electrical conductivity; has formed an interconnected network of fine plates and films. It is this microstructure which is responsible for the high electrical conductivity of the compact, thereby enabling the compact to be machined by EDM methods. This microstructure is not seen when either the mixed elements Si and Ti, or the mixed powders $Si_3N_4$ and $TiB_2$, are hot-pressed with CBN. It is believed that this microstructure may be partly responsible for the advantageous mechanical properties of the aforesaid CBN compacts in addition to their electrical conductivity. Compacts containing $HfB_2$ and $ZrB_2$ as components of the bonding matrix also possess similar properties.

In one embodiment of this invention, a liquid phase is present during the reaction between bonding agent and CBN. Accordingly, it is necessary to adjust the composition of the bonding agent and the temperature of the run to ensure the presence of at least a small proportion of the liquid phase. For bonding agents with compositions between TiSi and $TiSi_2$, the minimum melting point (eutectic; at atmospheric pressure lies at 1490° C. However, differential thermal analysis studies at 25 kilobars show that in the presence of CBN, the minimum melting temperature may be lowered to about 1250° C. owing to the solution of B and N in the liquid. Higher temperatures are needed to produce a liquid phase when zirconium and hafnium silicides are employed as bonding agents. The transient presence of a liquid phase facilitates rapid and pervasive reaction between the CBN and the bonding agent, leading to the production of a homogeneous and fine-grained microstructure in which the diboride phase forms an interconnected electrically conductive network extending throughout the compact. In this embodiment of the invention, compacts possessing optimum properties are produced at relatively low pressures, between 10-40 kilobars and the use of higher pressures is not necessary. Compacts of this type are preferably prepared wherein a major part of the volume occupied by the CBN crystals is comprised of crystal particles of more than 5 micron particle size.

In a second embodiment of the invention, the reaction between the bonding agent and CBN is performed essentially in the solid state, in the absence of a liquid phase or unit only a minor proportion of liquid phase present. Under these conditions, it may be desirable to employ finely particulate CBN and bonding agent, each with mean particle sizes smaller than 5 microns, in order to cause the reaction between these components to proceed to the desired degree of completion and to produce compacts with optimum textural homogeneity and mechanical properties. The use of higher pressures may be desirable when producing compacts under these conditions. Preferably the pressures used are between 40-70 kilobars and the reaction is carried out in the thermodynamic stability field of CBN. The resultant product possesses a different microstructure to that produced in the presence of liquid. However, provided that sufficient bonding agent is employed, the resultant compact possesses an electrical conductivity sufficiently high to permit shaping by EDM.

The preceding description of the invention has principally utilized examples in which titanium silicides were employed as bonding agents and the resultant compact contained titanium diboride as an essential component. It is emphasized that zirconium and hafnium silicides can be employed analogously to titanium silicides in the performance of this invention, thereby producing compacts containing zirconium diboride and hafnium diboride as essential components of the bonding matrices. Likewise, mixtures or alloys of titanium, and/or zirconium and/or hafnium silicides can be used as bonding agents, thereby producing compacts in which complex mixtures and solid solutions of titanium and/or zirconium and/or hafnium diborides are essential components of the bonding matrices.

Compacts produced according to the present invention possess important practical and commercial advantages over CBN compacts currently in use. They can be produced with larger physical dimensions which is of special benefit in certain applications, particularly grinding. Moreover, they are cheaper to produce. The components of the bonding matrix, $TiB_2$ and $Si_3N_4$, possess superior mechanical properties to those of the bonding matrix in CBN compacts which are marketed commercially - principally $AlB_2$ and AlN. These characteristics, combined with the unique microstructure of the product of the present invention, yield a product possessing great mechanical toughness, combined with a high compressive strength, greater than 10 kilobars, and high abrasiveness. Compacts produced according to the present invention readily turn, drill, grind and machine hardened metallic alloys such as tool steels, high-speed steels, cast iron, and nickel- and cobalt-based super-alloys. Their performance in machining these alloys is at least as good as that of current CBN compacts such as the product commercially known as Amborite, and in certain uses, is superior to those of existing CBN compacts. This is particularly the case in grinding applications.

A further major advantage of the product of the present invention is its substantial electrical conductivity, which permits the product to be worked and shaped by electrical discharge machining (EDM;. Presently available monolithic commercial compacts containing more than 70 volume percent of CBN, such as Amborite , possess much lower electrical conductivity and cannot be machined by EDM methods.

The production of CBN compacts according to the present invention is described in the following examples and it is to be understood that these are not to be considered as limiting the scope of the invention in any way:

EXAMPLE 1

A bonding agent with a mean atomic composition $Si_3Ti_2$ was prepared by intimately mixing 53.2 wt % titanium metal powder (minus 40 microns) with 46.8 wt % silicon powder (minus 5 microns). The mixture was placed in an evacuated silica tube and heated to 1100° C. for 15 minutes. The mixture reacted to form an alloy of silicon and titanium. After cooling, the alloy was shown by X-ray diffraction to consist mainly of a mixture o( two phases, $Si_2Ti$ and SiTi. The product was then ground under acetone to a particle size smaller than 5 microns. This alloy, possessing a mean composition equivalent to $Si_3Ti_2$, constituted the bonding agent in the present example.

A mixture comprising 80 wt % of CBN (mean particle size: 30 microns; and 20 wt % CBN (mean particle size: 6 microns) was then prepared. An amount of 82.5 wt % of the CBN mixture was then intimately mixed with 17.5 wt % of the powdered $Si_3Ti_2$ bonding agent. The mixture was placed in a cylindrical capsule of hexagonal boron nitride possessing internal dimensions 12 mm diameter × 22 mm long. The capsule was closed with a lid of hexagonal boron nitride and placed within a piston-cylinder high pressure-high temperature apparatus. The design of the apparatus and pressure cell was generally similar to the piston-cylinder apparatus described by F. Boyd and J. England (J. Geophys. Res. 65, 741, 1960). The internal diameter of the pressure vessel was 2.54 cm, its height was 8 cm, and the heater was a graphite tube which itself was surrounded by a ductile pressure medium.

A pressure of 2 kilobars was first applied to consolidate the components of the pressure cell. The temperature and pressure of the CBN-Si$_3$Ti$_2$ mixture were then increased to 600° C. and 10 kilobars over a period of 6 minutes. Temperature was then raised to 1100° C. and held steady. Pressure was then increased to 25 kilobars over a period of 5 minutes. This step causes a desirable degree of densification of the charge accompanied by plastic deformation of the CBN crystals. Temperature was then increased to the run temperature of 1400° C. over a period of 2 minutes. Pressure and temperature were then held constant for 20 minutes to allow the desired reaction between the bonding agent and the CBN crystals. After completion of the run, temperature was first reduced to 800° C. whilst maintaining full pressure. Pressure was then slowly released over 30 minutes from 25 to 5 kilobars whilst holding temperature steady at 800° C. Temperature and pressure were then lowered in parallel to ambient conditions over a further 20 minutes. The sample capsule was then removed from the apparatus.

The powder mixture comprising the starting material was found to have formed a CBN compact which was recovered in the form of an intact cylinder. After sandblasting, the compact was found to possess a diameter of 11.5 mm, a height of 13 mm and a density of 3.52 g/cm$^3$. The compact possessed a substantial electrical conductivity and could readily be shaped by electrical discharge machining (EDM). Its resistivity was 0.01 ohm cm.

Examination of a sample by X-ray diffraction showed that it consisted of CBN, TiB$_2$ and Si$_3$N$_4$ with a small amount (<5%) of unreacted Si$_2$Ti. Hexagonal boron nitride was below the detection limit (<0.5%). These identifications were confirmed by electron-probe microanalyses and optical studies. The sample was essentially fully dense and CBN crystals displayed extensive plastic deformation, so that crystals were in contact or adjacent to one another along shared complementary surfaces produced by plastic deformation. The X-ray and optical study showed that the Si$_3$Ti$_2$ bonding agent had reacted essentially completely with CBN crystals to form a bonding matrix compromising a mixture or intergrowth of titanium diboride (TiB$_2$) and silicon nitride (Si$_3$N$_4$). Although the pressure and temperature conditions under which this reaction occurred were deeply in the thermodynamic stability field of hexagonal boron nitride, the amount of this latter phase, which could have been formed by retrogressive transformation of CBN, was negligible. The amount of bonding matrix (TiB$_2$+Si$_3$N$_4$) present was estimated at about 25 volume percent, these two phases being present in approximately similar proportions.

The microstructure of the compact was remarkable. Although the melting point of the Si$_3$Ti$_2$ bonding agent was above the run temperature, and the products of the reaction, (the TiB$_2$ and Si$_3$N$_4$ bonding matrix) both possess melting points above 1900° C., the bonding matrix had penetrated along grain boundaries in thin films and had infiltrated the mass of CBN crystals. Optical and electronprobe examination showed that the CBN crystals were to a large extent surrounded by films of Si$_3$N$_4$ whilst the TiB$_2$ phase occurred as intergranular plates and films forming an interconnected network. This unique microstructure of the CBN compact produced according to the present invention is believed to be substantially responsible for its excellent mechanical properties and for its high electrical conductivity.

A number of tools and other pieces were cut from the cylindrical CBN compact by EDM. The compact was found to possess outstanding impact strength and excellent hardness. When broken, fracture surfaces were found to pass through CBN crystals, illustrating the strength of the bond between CBN and the bonding matrix. The compressive strength of a compact was measured and found to be 38 kb. Tools prepared from the product of the invention were used to turn a range of alloys including Bohler K720 cold work steel (Rc 60), Assab Werke 45 high speed steel (Rc 65), cast iron, stellite, and nimonic and inconel super-alloys. These alloys were turned readily with the tool with depth of cut up to 0.5 mm and varying surface feed rates. Tool wear was minimal. The turning performance of tools made according to the present invention was considerably superior to that of tungsten carbide tools. The performance of the present tools was compared with that of Amborite tools. (Amborite is a commercially-produced CBN compact manufactured by De Beers Ltd.). In most turning operations under similar conditions, the performance of the product of the present invention was superior to that of Amborite, in terms of the amount of tool wear in relation to the amount of stock removed from the test sample.

EXAMPLE 2

A sample compact was prepared in the same manner as in Example 1 except that the CBN used was prepared as a mixture of 80% CBN crystals possessing a mean size of 80 microns and 20% of CBN crystals possessing a mean size of 30 microns. After preparation, and removal from the apparatus, the sample was found to possess a diameter of 11.3 mm, a length of 12.5 mm and density of 3.48 g/cm$^3$.

The sample was then fabricated by EDM into a true cylinder OD 10 mm, length 10 mm, with an axial hole 5 mm in diameter. The cylinder was etched in molten potassium hydroxide for 2 minutes, thereby dissolving some TiB$_2$ from the bonding matrix at the surface and loosening the outermost layer of CBN crystals. The sample was then sandblasted to produce a rough surface of pristine CBN crystals. This sample was then mounted on a steel shaft to produce a CBN grinding wheel.

The grinding wheel was used for internal and external grinding of several hard alloys including Bohler K720 cold work steel (Rc 60), Assab Werke 45 high speed steel (Rc 65), cast iron, stellite, and nimonic and inconel super-alloys. Parallel tests on these materials were carried out using commercially available impregnated CBN grinding wheels. The performance of the product of the present invention was considerably superior to that of commercial impregnated CBN grinding wheels. Stock-removal rates displayed by the wheel of the present invention were 3-5 times higher and wheel wear was 5-10 times lower than for commercial CBN grinding wheels. The difference arises because of the much higher packing-density of CBN particles in the wheel of the present invention, combined with high compressive strength and the use of a bonding matrix which is vastly stronger than the matrices (resin, metal, vitreous) of commercial impregnated CBN grinding wheels.

Commercial manufacturers of CBN compacts have not hitherto found it practical to market CBN compact grinding wheels. It is believed that this is because the production technology currently used to produce commercial compacts cannot readily produce them in monoliths large enough to permit practically useful grinding wheels to be fabricated. Moreover, there are practical difficulties in fabricating grinding wheels from existing monolithic commercial CBN compacts such as Amborite which possesses low electrical conductivity and cannot readily be shaped by EDM.

EXAMPLE 3

The CBN compact of this Example was prepared using the same procedure as for Example 2, and using the same pressure vessel, except that the size of the hexagonal boron nitride capsule was 16 mm ID×27 mm long, and the graphite heater was accordingly enlarged. The CBN compact produced in this Example comprised an intact cylinder which was 16 mm in diameter and 17 mm long, with a density of 3.49 g/cm$^3$. This example illustrates that the size of the CBN sample produced by the process of the present invention seems to be limited only by the capacity of the pressure vessel. There is little doubt that it will be possible to produce much larger monolithic CBN compacts by using larger pressure vessels.

EXAMPLE 4

In this and in the following Examples a pressure vessel with a diameter of 1.5 cm and a length of 5 cm was employed. The hexagonal boron nitride containment capsule possessed an ID of 5 mm and length of 6 mm. Except for these specific variations, the runs were carried out similarly to the procedures described in Example 1. The CBN compacts recovered after the runs were approximately 4.2 mm (dia)×4 mm long.

The quality of samples produced was assessed by investigation of their impact strength, compressive strength and capacity to turn hard ferrous alloys. In the following Tables, the grade A means that the compact was judged to be equivalent or superior in these properties to the commercial CBN compact - "Amborite" produced by De Beers Ltd. The grade B means that the compacts were similar or only slightly inferior to Amborite and were superior to tungsten carbide. This class of compact could be used effectively in practical machining operations. Grade C means that the compact was substantially inferior to Amborite in machining performance but could be used in certain practical applications such as grinding wheels. Grade D means that the compact was of poor quality and not regarded as being of commercial significance.

Example 4 illustrates the effects of varying run pressure (whilst maximum temperature was applied) upon the qualities of samples. The composition of the starting materials in these runs were identical to that in Example 1. Run times were 20 minutes at 1400° C. Results are given in Table 1.

TABLE 1

| Example | Pressure (kb) | Quality |
| --- | --- | --- |
| 4a | 60* | A |
| 4b | 40 | A |
| 4c | 30 | A |
| 4d | 25 | A |
| 4e | 20 | A |
| 4f | 15 | B |
| 4g | 10 | C |

TABLE 1-continued

| Example | Pressure (kb) | Quality |
| --- | --- | --- |
| 4h | 5 | D |

*This run was carried out in a girdle-type, high pressure-high temperature apparatus. (See Liebermann et al., Prof. 4$^{th}$ Internat. Conf. on High Pressure, Kyoto, 1974, pp. 495–502)

EXAMPLE 5

This Example illustrates the effect of the duration of the run (at maximum pressure and temperature; upon the quality of the sample. The compositions of the starting materials in these runs were identical to that in Example 1. All runs were carried out at 25 kb and 1400° C. Results are given in Table 2.

TABLE 2

| Example | Time (mins) | Quality |
| --- | --- | --- |
| 5a | 1 | C |
| 5b | 5 | A |
| 5c | 20 | A |
| 5d | 30 | A |
| 5e | 60 | A |

EXAMPLE 6

This Example illustrates the effect of the temperature of the run (at maximum pressure) upon the quality of the compact. The compositions of the starting materials and the other conditions in these runs were similar to that in Example 1. All runs except 6 g were carried out for 20–30 minutes at 25 kb. Run 6 g was carried out for 5 minutes. Results are given in Table 3.

TABLE 3

| Example | Temperature | Quality |
| --- | --- | --- |
| 6a | 1000 | C |
| 6b | 1200 | B |
| 6c | 1300 | B |
| 6d | 1350 | A |
| 6e | 1400 | A |
| 6f | 1450 | A |
| 6g | 1500 | A |
| 6h | 1550 | B |
| 6i | 1700 | C |

EXAMPLE 7

This Example illustrates the effect of the composition and proportions of the Si-Ti alloy bonding agent on the quality of the sample Apart from the composition and proportions of bonding agent, the conditions of the runs were similar to those of Example 1. Results are given in Table 4.

TABLE 4

| Example | Composition of bonding agent wt % | Proportion of bonding agent Wt % | Quality |
| --- | --- | --- | --- |
| 4a | Si | 20 | D |
| 4b | $Si_{78}Ti_{22}$ | 11.2 | D |
| 4c | $Si_{55}Ti_{45}$ | 17.5 | B |
| 4d | $Si_{46.8}Ti_{53.2}$ | 17.5 | A |
| 4e | $Si_{46.8}Ti_{53.2}$ | 11.2 | A |
| 4f | $Si_{35}Ti_{65}$ | 17.5 | B |
| 4g | $Si_{28}Ti_{72}$ | 11.2 | D |
| 4h | $Si_{8.5}Ti_{91.5}$ | 11.2 | D |
| 4i | $Si_{8.5}Ti_{91.5}$ | 20 | D |
| 4j | $Ti_{100}$ | 20 | D |
| 4k | $Ti_{100}$ | 20 | D |

EXAMPLE 8

This Example illustrates the effect of the proportion of the bonding agent ($Si_3Ti_2$ alloy) to CBN on the quality of the compact. Apart from the proportion of bonding agent, run conditions were similar to those in Example 1. Results are given in Table 5.

TABLE 5

| Example | Proportion of $Si_3Ti_2$ bonding agent (wt %) | Quality |
|---------|-----------------------------------------------|---------|
| 5a | 6 | C |
| 5b | 11.2 | A |
| 5c | 17.5 | A |
| 5d | 25 | A |
| 5e | 30 | A |
| 5f | 40 | B |

EXAMPLE 9

This example illustrates the effect of adding the bonding agents as mixtures of elemental silicon and titanium powders or of mixtures of $TiB_2$ and $Si_3N_4$ powders. Atomic ratio of silicon to titanium in the bonding agent is approximately 3 to 2. Results are given in Table 6.

TABLE 6

| Example | Composition of bonding agents | Amount of bonding agent (wt % in compact) | Quality |
|---------|------|------|---|
| 9a | Ti powder, (minus 20μ) plus Si powder (minus 5μ) | Ti 6.2 Si 5.0 | D |
| 9b | Ti powder (minus 5μ) made by calcining $TiH_2$, plus Si powder (minus 5μ) | Ti 9.7 Si 7.8 | D |
| 9c | Physical mixture of $TiB_2$ powder and $Si_3N_4$ powders (minus 5μ) | $TiB_2$ 15 $Si_3N_4$ 12 | B,C* |
| 9d | $TiB_2$ powder (minus 5μ) | $TiB_2$ 30 | C |
| 9e | $Si_3N_4$ powders (minus 5μ) | $Si_3N_4$ 25 | D |

*These experiments utilize titanium diboride derived from two different sources.

EXAMPLE 10

A bonding agent with a mean atomic composition $Si_3Hf_2$ and particle size less than 5 microns was prepared by the same technique used to prepare the $Si_3Ti_2$ bonding agent in Example 1. An amount of 32 wt % of the $Si_3Hf_2$ bonding agent was then intimately mixed with 54 wt % of CBN (mean particle size 30 microns) and 14 wt % of CBN (mean particle size 6 microns). The mixture was then hot-pressed at 25 kilobars and 1500° C. for 30 minutes according to the procedures described in Example 1 except that the smaller pressure vessel of Example 4 was utilized. The sample was recovered as an intact cylinder with a diameter of 5.0 mm, a height of 4.3 mm and a density of 4.33 g/cm³. The compact possessed a substantial electrical conductivity and could be shaped by electrical discharge machining (EDM). Examination of a sample by X-ray diffraction and electronprobe microanalysis showed that it consisted of CBN, $HfB_2$ and $Si_3N_4$ together with a minor amount, estimated as less than about 5%, of unreacted hafnium silicides, mainly $HfSi_2$. The amount of hexagonal boron nitride formed was smaller than X-ray detection limits (<0.5%). Examination of a polished surface showed that the bonding matrix of $HfB_2$ and $Si_3N_4$ had penetrated extensively along CBN grain boundaries, analogously to the product of Example 1. The calculated proportion of bonding matrix is 25% by volume, which is consistent with the measured density.

The product of this Example possessed outstanding impact and compressive strengths and was highly abrasive. These properties were at least as good as those of the best compact so far prepared according to the procedures described in Example 1. Moreover, the present Example demonstrated that the reaction of $Si_3Hf_2$ alloys with CBN proceeds analogously to the corresponding reaction of $Si_3Ti_2$, producing a bonding agent comprised mainly of $Si_3N_4$ plus a metallic diboride, $HfB_2$. It is well known that $HfB_2$ possesses a higher melting point and is more resistant to oxidation by air at high temperatures than $TiB_2$; moreover, its crystal structure is similar to that of $TiB_2$. Thus, it is expected that the replacement of $TiB_2$ by $HfB_2$ in a compact may provide some technologically advantageous properties.

EXAMPLE 11

A bonding agent with a mean atomic composition $Si_3Zr_2$ and particle size less than 5 microns was prepared by the same technique used to prepare the $Si_3Ti_2$ bonding agent in Example 1.

An amount of 22 wt % of the $Si_3Zr_2$ bonding agent was then intimately mixed with 62 wt % of CBN (mean particle size 30 microns; and 16 wt % of CBN (mean particle size 6 microns). The mixture was then hot-pressed at 25 kilobars and 1500° C. for 30 minutes according to the procedures described in Example 1, except that the smaller pressure vessel of Example 4 was utilized. The sample was recovered as an intact cylinder. It possessed a substantial electrical conductivity which would permit it to be shaped by electrical discharge machining (EDM). Examination of a sample by X-ray diffraction and electronprobe microanalysis showed that it consisted of CBN, $ZrB_2$ and $Si_3N_4$, together with a minor but significant amount, estimated as up to 8%, of unreacted zirconium silicides, mainly $ZrSi_2$. The amount of hexagonal boron nitride formed was smaller than X-ray detection limits (0.5%). Examination of a polished surface showed that the bonding matrix, consisting mainly of $ZrB_2$ had penetrated extensively along CBN grain boundaries, analogously to the product of Example 1. The calculated proportion of bonding matrix is 25% by volume.

The product of this Example possessed high impact and compressive strengths and was highly abrasive. These properties were not quite as good as those of the compact of Example 10, but the compact was nevertheless of commercially useful quality. According to the quality scale defined in Example 4, the compact of the present Example would rank as B grade.

This Example demonstrated that the reaction of $Si_3Zr_2$ alloys with CBN proceeds analogously to the corresponding reaction of $Si_3Ti_2$ producing a bonding agent comprised mainly of $Si_3N_4$ plus a metallic diboride, $ZrB_2$. It is well known that $ZrB_2$ possesses a higher melting temperature and is more resistant to oxidation by air at high temperatures than $TiB_2$; moreover, its crystal structure is similar to that of $TiB_2$. Thus it is expected that the replacement of $TiB_2$ by $ZrB_2$ in a compact may provide some technologically advantageous properties.

In the present Example, the reaction of $Si_3Zr_2$ with CBN did not proceed to the same degree of completion as the reaction of $Si_3Ti_2$ with CBN as described in Example 1. Accordingly, a minor but significant amount of unreacted zirconium silicides remained in the compact.

It is believed that this characteristic is responsible for the observation that the properties of the present compact were not quite as advantageous as those of the compact of Example 1. It would be expected that had the reaction proceeded still further towards completion, the properties of the product would have been correspondingly enhanced. The extent of this reaction is governed by the principles of chemical kinetics. It is obvious to one skilled in the art that a more complete degree of reaction would have been obtained by some combination of increasing the reaction time, and decreasing the particle sizes of the CBN and/or the $Si_3Zr_2$ bonding matrix. Thus, it can reasonably be expected that modest variations in the reaction conditions would be likely to produce a compact possessing highly advantageous mechanical properties.

EXAMPLE 12

A bonding agent, comprising a mixture of 9 wt % $Si_3Ti_2$, 17.5 wt % of $Si_3Hf_2$ and 73.5 wt % of CBN was prepared using procedures analogous to those described in Example 10. The mixture was hot-pressed under similar conditions to those of Example 10. The resultant compact was analysed by electronprobe. The bonding matrix was found to consist of an intergrowth consisting mainly of a diboride solid solution $(Hf_{0.65}Ti_{0.35})B_2$ plus silicon nitride. The physical properties of the compact were similar to those of the compact produced in Example 11.

EXAMPLE 13

An intimate mixture comprising 82.5 wt % of CBN with a mean particle size of 3 microns and 17.5 wt % of $Si_3Ti_2$ with a similar particle size was prepared. It was contained in a boron nitride capsule 5 mm diameter and 5 mm deep which was placed in a "girdle" high pressure - high temperature apparatus. Pressure was raised to 55 kilobars and the temperature was then increased to 1350° C. and held for 10 minutes. The compact thereby produced was removed from the apparatus. It was found to possess generally similar abrasive properties to the compact of Example 1, except that it produced a smoother finish when machining hard steel workpieces. This was probably caused by its finer particle-size. In contrast, when a pressure of 25 kb was used on similarly prepared 3 micron starting material, the product was relatively weak. This Example demonstrates that high operating pressures may be advantageous when the particle-size of CBN used in the performance of the invention is smaller than about 5 microns.

EXAMPLE 14

The compact of this Example was prepared using generally similar procedures as for Example 4, except that the bulk sample additionally contained 5 wt % $TiO_2$ as a component of the bonding agent. After completion of the run, the silicon nitride phase in the compact was analyzed by an electronprobe microanalyzer and found to comprise (wt %): Si-43.8, Ti-1.5, N-33.4 and 0-12.7, making a total of 91.4 wt %. It is assumed that the "missing 8.6%" comprises boron which cannot be analyzed by the electronprobe. Thus the atomic composition of this phase is believed to have been approximately $Si_2N_3OB$. Its X-ray powder diffraction pattern was similar to that of $\beta$-$Si_3N_4$, but there were minor differences. The Example illustrates that it is possible to produce compacts in which one of the phases of the bonding matrix is dominantly composed of silicon nitride, but contains, in addition, some oxygen and perhaps some boron within its crystal lattice.

I claim:

1. A method for producing a cubic boron nitride (CBN) compact which comprises the steps of:
   (a) intimately mixing a mass of particulate CBN crystals with a bonding agent in the proportions 95 to 60 volume percent of CBN and 5 to 40 volume percent of bonding agent, said bonding agent containing silicon and metal atoms selected from the group consisting of titanium, zirconium and hafnium atoms in the atomic proportions $Si_{30}M_{70}$ to $Si_{85}M_{15}$, where M represents said metal atoms;
   (b) subjecting the mixture of CBN crystals and bonding agent to temperatures in the range 900° to 1800° C. and pressures in the range 5 to 70 kilobars; and
   (c) maintaining the temperature and pressure conditions on the mixture for a period of at least about 30 seconds, sufficient to cause most of the Si and M atoms of the bonding agent to react with the CBN crystals to form a bonding matrix in situ composed of an intimate mixture of two phases, one of which consists essentially of or consists of silicon nitride ($Si_3N_4$) and the other of which is a metallic diboride ($MB_2$) phase, each of said phases comprising at least 25 volume percent of the bonding matrix.

2. A method as claimed in claim 1, wherein the bonding agent contains said silicon and metal atoms in the atomic proportions $Si_{40}M_{60}$ to $Si_{70}M_{30}$.

3. A method as claimed in claim 1, wherein the bonding agent contains said silicon and metal atoms substantially in the atomic proportions $Si_{60}M_{40}$.

4. A method as claimed in claim 1, wherein said temperature and pressures are applied in a sequence and over a sufficient time to cause substantial plastic deformation of the CBN crystals.

5. A method as claimed in claim 4, wherein the intimately mixed mass of CBN crystals and bonding agent are subjected initially to an elevated pressure below the maximum pressure to be applied thereto in the method, and subsequently to elevated temperatures of at least 800° C. after which the applied pressure is increased to said maximum.

6. A method as claimed in claim 5, wherein the applied pressure is increased to said maximum over a period of about 2 to 15 minutes.

7. A method as claimed in claim 1, wherein said bonding agent comprises an alloy of or a mixture of intermetallic compounds of silicon and any one or more of the metals titanium, zirconium and hafnium.

8. A method as claimed in claim 7, wherein the silicon and metal atoms in the bonding agent are in the overall atomic proportions $Si_{70}M_{30}$ to $Si_{40}M_{60}$.

9. A method as claimed in claim 1, wherein the bonding agent comprises an alloy of or a mixture of intermetallic compounds of silicon and any one or more of the metals titanium, zirconium and hafnium in which the proportions of silicon atoms and metal atoms are generally in the ratio 3:2.

10. A method as claimed in claim 1, wherein the intimately mixed mass of CBN crystals and bonding agent are subjected to a maximum temperature in the range 1200° to 1800° C. and a maximum pressure in the range 20 to 40 kilobars.

11. A method as claimed in claim 10, wherein a major part of the volume occupied by the CBN crystals is comprised of crystal particles of more than 5 microns particle size.

12. A method as claimed in claim 1, wherein the intimately mixed mass of CBN crystals and bonding agent are subjected to a maximum temperature in the range 1200° to 1800° C. and to a maximum pressure in the range 40 kilobars to 70 kilobars.

13. A method as claimed in claim 12, wherein the CBN crystals have a mean particle size than 5 microns.

14. A method as claimed in claim 1, wherein the bonding agent contains atoms chosen from the group of oxygen, boron and aluminum which enter the structure of the silicon nitride so as to be contained in solid solution in the silicon nitride phase.

15. A method as claimed in claim 1, wherein the metallic diboride comprises an electrically conductive phase whereby the resulting compact possesses an electrical conductivity high enough to permit it to be shaped by electrical discharge machining.

16. A method as claimed in claim 1, wherein the proportion of bonding agent is in the range 10 to 25 volume percent.

17. An abrasive compact comprising 40 to 90 volume percent of cubic boron nitride (CBN) crystals bonded by 60 to 10 volume percent of a bonding matrix comprised mainly of an intimate mixture of two phases, one of which consists essentially of or consists of silicon nitride ($Si_3N_4$) and the other of which is a metallic diboride $MB_2$ phase, where M represents metal atoms selected from the group consisting of titanium, zirconium and hafnium atoms, each of said phases comprising at least 25 volume percent of the bonding matrix, said bonding matrix producing a strong and coherent bond between the CBN crystals wherein the CBN crystals are substantially surrounded by adjoining rims of the silicon nitride phase and the metallic diboride phase is substantially separated from the CBN crystals by the silicon nitride phase and forms an interconnected electrically conducting network whereby the compact possesses an electrical conductivity high enough to permit it to be shaped by electrical discharge machining.

18. A compact as claimed in claim 17, wherein the proportion of bonding matrix is in the range 40 to 15 volume percent.

19. A compact as claimed in claim 17 and possessing a compressive strength of at least 10 kilobars.

20. A compact as claimed in claim 17 wherein said diboride comprises an electrically conductive phase whereby the compact possesses an electrical conductivity high enough to permit it to be shaped by electrical discharge machining.

21. A compact as claimed in claim 20, wherein the CBN crystals display substantial plastic deformation at the boundaries between adjacent crystals and the bonding matrix penetrates between adjacent crystals along said boundaries to produce an interconnected electrically conductive network.

22. A method as claimed in claim 1, wherein the bonding agent contains aluminum atoms in an amount less than the amount of silicon atoms, said aluminum atoms being present within the silicon nitride.

* * * * *